Patented June 23, 1942

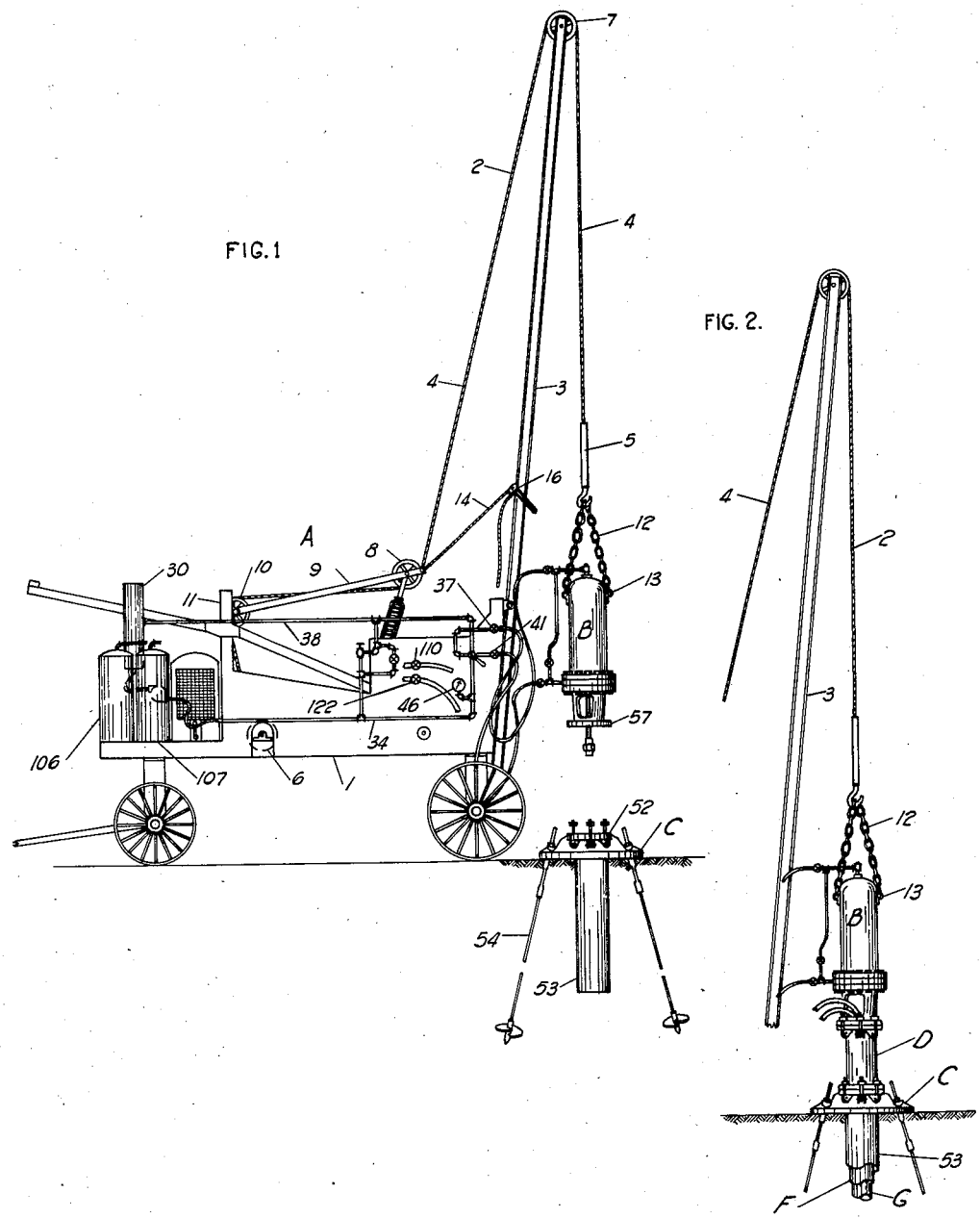

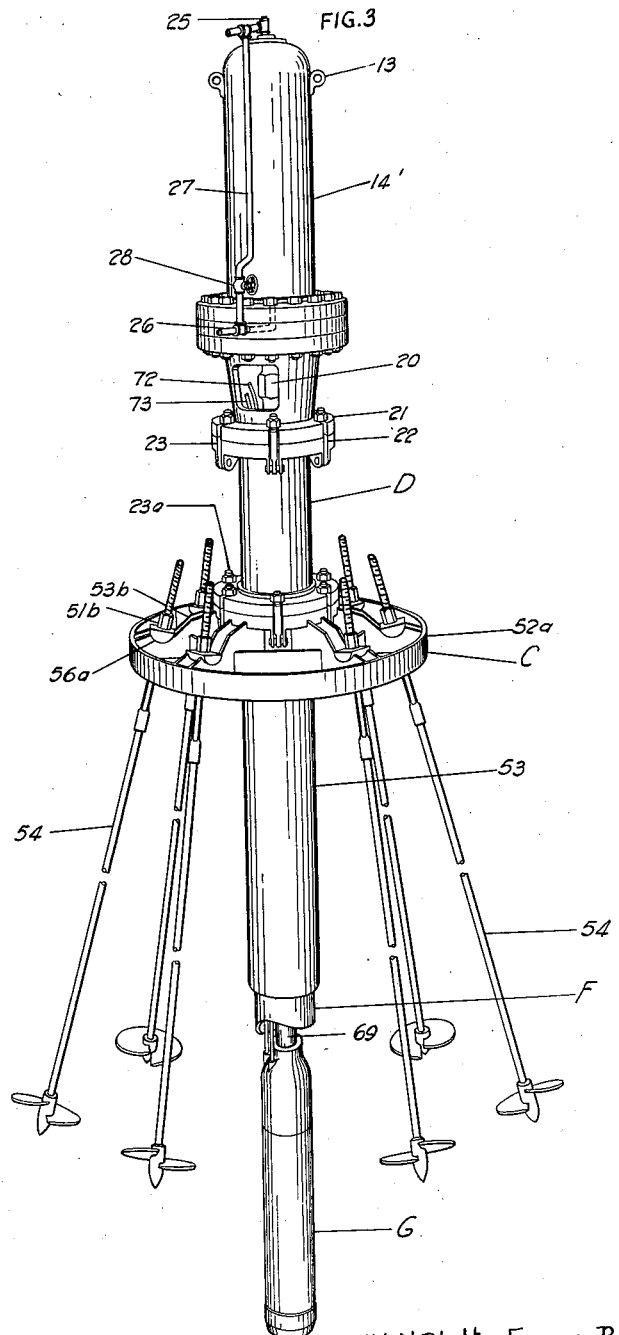

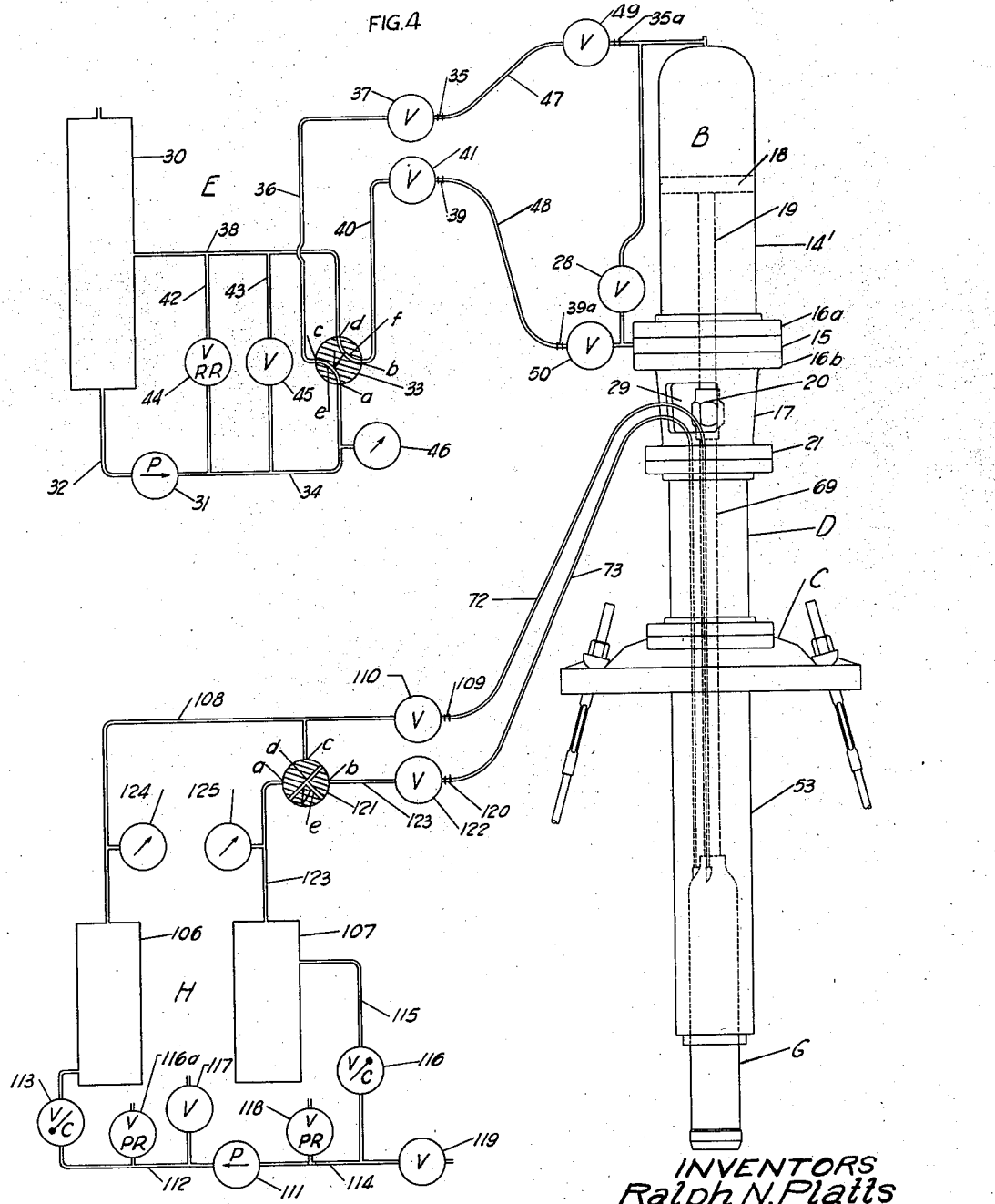

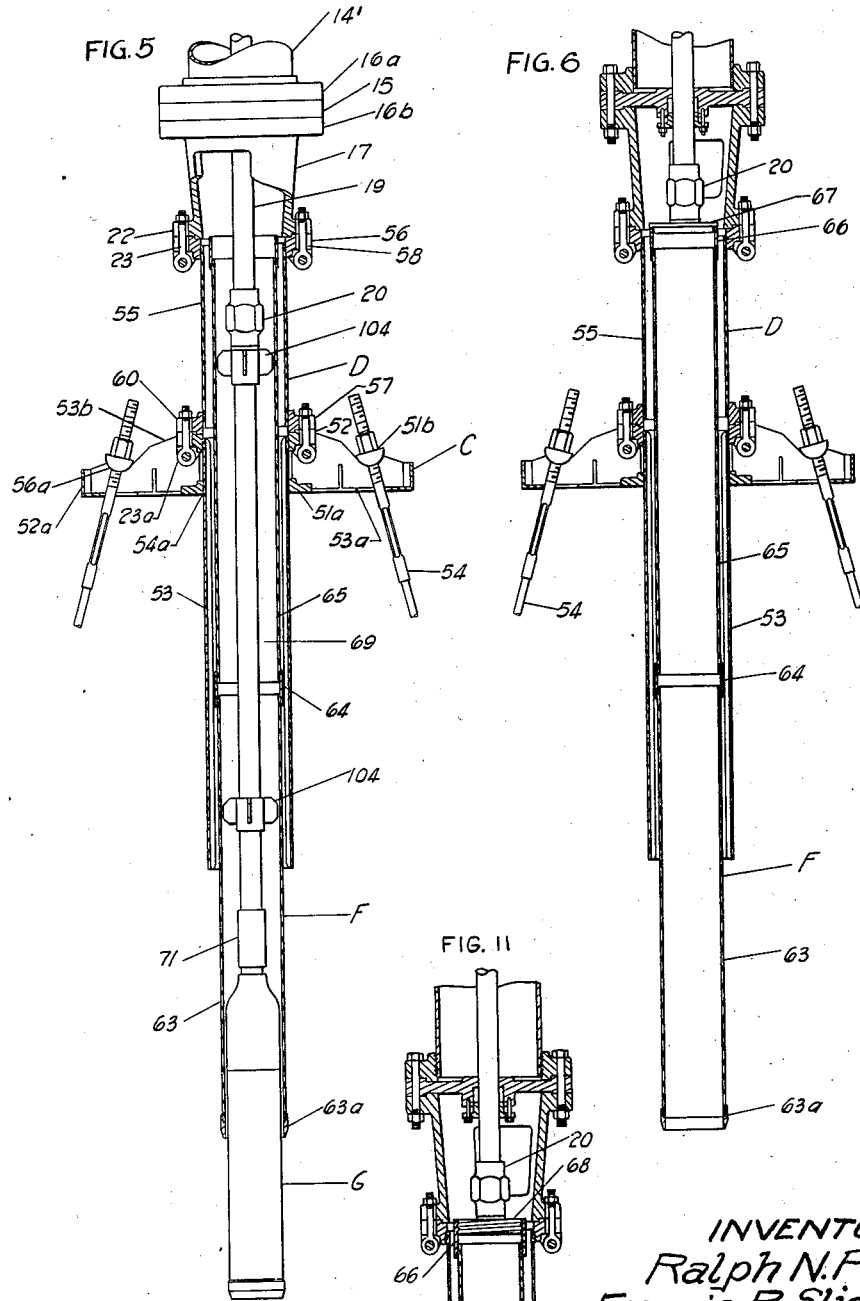

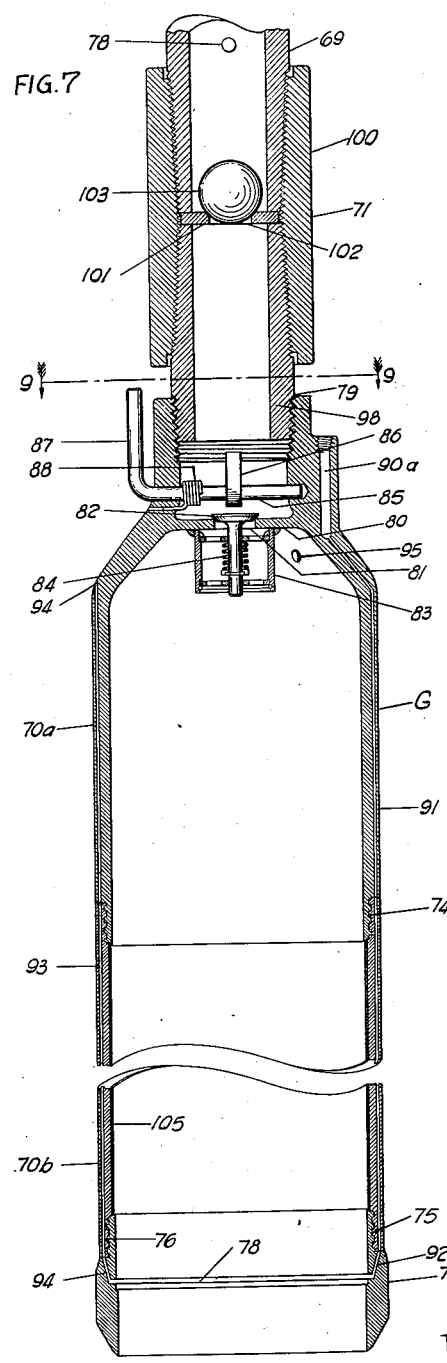
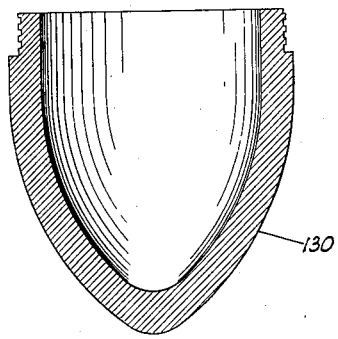
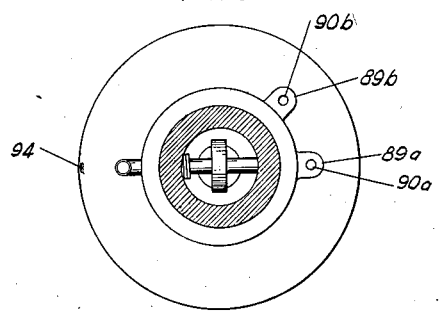
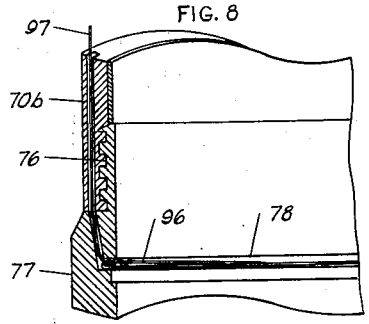

2,287,059

UNITED STATES PATENT OFFICE 2,287,059

APPARATUS FOR OBTAINING SOIL SAMPLES

Ralph N. Platts, Jackson County, Mo., Francis B. Slichter, Johnson County, Kans., Ernest L. O'Donnell, Jackson County, Mo., and Preston T. Bennett, Johnson County, Kans.

Application May 25, 1940, Serial No. 337,210

16 Claims. (Cl. 255—1.4)

(Granted under the act of March 3, 1883, as amended April 30, 1928; 370 O. G. 757)

This invention described herein may be manufactured and used by or for the Government for governmental purposes, without the payment to us of any royalty thereon.

This invention generically relates to the art of boring and drilling, more specifically it is directed to a novel apparatus for obtaining undisturbed and incontaminated drive samples for the purpose of determining the physical properties and geological characteristics of the earth formations at the levels from which the samples have been taken.

One object of this invention is to provide a method of and an apparatus for procuring a non-compacted soil sample under percussion and agitation-free conditions, so that the sample secured will retain its identity geologically and otherwise with respect to the strata from which it has been obtained and thus afford more dependable working data relative to subsurface soil formations.

Another object of this invention is to afford a method of and apparatus for procuring undisturbed and uncontaminated soil samples by means of which the sample is formed in a metallic liner within the sample-taking barrel, whereby after the sample has been taken and the barrel raised to the surface the sample containing liner may be removed, capped and sealed without disturbing the geological characteristics of the sample.

Another object of this invention is to provide a method and apparatus wherein a pneumatic unit and a sample barrel are functionally interrelated for the purpose of pneumatically excluding water from the sample barrel as it is lowered into sample-taking position and likewise for retaining the sample within the barrel, protected against contamination while the barrel is being brought to the surface.

Another object of this invention is to provide a portable sample-taking apparatus embodying a hoist manipulated prime-mover which is adapted to be detachably connected with an anchorage device, the latter including means to prevent its displacement by either the horizontal or the vertical forces to which it is subjected when the apparatus is in operation.

Another object of this invention is to provide an apparatus of the type mentioned which embodies a prime-mover adapted to be raised and lowered by the hoisting mechanism of a conventional drill rig and to be coupled rigidly to a ground anchored base ring assembly, the latter including extension means for permitting the use of drive stem and casing sections having twice the length of the effective stroke of the prime-mover piston.

Other objects of this invention are to provide a readily responsive hydraulic pressure unit for the prime-mover; to afford a simple and easily disassembled soil-taking apparatus adapted to be used in connection with the hoisting mechanism of a conventional drilling rig; to furnish an apparatus by which the sample barrel will be driven into the soil with a steady and constant downward motion and the sample formed with a single downward stroke of the prime-mover piston and finally to provide a sample-taking apparatus embodying means controlled from the surface for separating the sample from the mother strata.

With these and other objects in view this invention consists in certain details of construction, combination and arrangement of parts to be more particulary hereinafter described and claimed.

Briefly stated, this invention consists of a power or manually operated hoisting mechanism suitably mounted upon a drill rig or the like; a prime-mover adapted to be suspended from the bale or traveling block of the hoisting mechanism; a base ring assembly including a base ring, anchoring rods, a guide tube depending from the base ring, a base ring extension and coupling means in conection with the base ring, its extension and the prime-mover, whereby they may be rigidly connected in operative relation; a sectional casing extending through the base ring extension and depending guide tube and adapted to be driven into the soil or withdrawn through the instrumentality of a driving or pulling head detachably connected to the piston rod of the prime-mover, a hydraulic pressure unit operatively associated with the prime-mover to impart reciprocatory movement to its piston; a sample barrel assembly embodying a barrel, a sectional drive stem detachably connecting the upper end of the barrel with the piston rod of the prime-mover, a pneumatic unit serving said barrel, a remote control surface operated sample severing device disposed in the shoe at the lower end of the sample barrel, and an automatically and manually operated valve means within the upper end of the sample barrel.

Referring to the accompanying figures to which corresponding parts are indicated by similar reference characters—

Fig. 1 is a side elevation of a conventional drill ring, with the prime-mover and base ring assembly of the instant invention suspended from the hoisting mechanism and in position to be lowered onto the base ring assembly;

Fig. 2 is a fragmentary elevation illustrating a portion of the hoisting mechanism of the drill rig and showing the prime-mover coupled to the ground anchored base ring assembly through the medium of the base ring extension;

Fig. 3 is a perspective view showing the prime-mover, base ring extension, base ring assembly and sample-taking barrel in operative relation, a portion of the casing being broken away;

Fig. 4 is a fragmentary diagrammatic view illustrating the prime-mover, base ring extension, base ring assembly and sample-taking barrel in operative relation and the hydraulic and pneumatic units connected with the prime-mover and sample-taking barrel, respectively;

Fig. 5 is a fragmentary sectionized view illustrating a portion of the prime-mover, the base ring extension, base ring assembly, sectional casing and sample-taking barrel in operative relation, and showing the drive stem connection between the piston rod of the prime-mover and the sample barrel;

Fig. 6 is a fragmentary sectionized view, illustrating the lower portion of the prime-mover, base ring extension, base ring assembly and sectional casing, and showing the driving head carried by the piston rod of the prime-mover in driving relation with respect to the upper end of the sectional casing;

Fig. 7 is a fragmentary vertical section of the sample barrel and a portion of the lower end of the drive stem, to which the sample barrel is connected;

Fig. 8 is a fragmentary sectionized detail of the lower end of the sample-taking barrel and illustrating the arrangement of the snare in the drive shoe for cutting the sample;

Fig. 9 is a horizontal section taken on a line 9—9 of Fig. 7;

Fig. 10 is a transverse vertical section of a bullet-nosed sample barrel shoe adapted to replace the drive shoe shown in Fig. 7, and Fig. 11 is a fragmentary detail illustrating the application of the pulling head.

In the conventional prior art the available equipment renders it extremely difficult to obtain undisturbed and uncontaminated soil samples, due to (a) the percussive and agitative forces to which the sample is subjected while it is being taken, (b) to the failure of existing apparatus to provide adequate facilities for completely excluding water or other contaminating fluids from the sample barrel as it is lowered into the casing or when it is raised to the surface with the sample. These and other factors, such as undue compacting of the soil as the sample is formed and disarrangement of the earth formations as the sample is prepared for transmission to the soil laboratories, tend to lessen the value of the sample as a true specimen.

It is therefore the aim and purpose of this invention to overcome these defects by providing a method of and apparatus for procuring either a continuous sample or samples at selected depths which will reach the laboratory in a condition to give accurate and dependable information regarding the chemical and physical properties of the soil at any desired depth beneath the earth's surface.

For the sake of convenience, this invention will be discussed in the order of its fundamental components, namely, hoisting mechanism, prime mover, hydraulic pressure unit, base ring assembly, base ring extension, sectional casing assembly, sample barrel construction, pneumatic unit associated with the sample barrel, operation and conclusion.

*Hoisting mechanism.*—In the illustrated embodiment characterizing this invention and referring especially to Fig. 1 of the drawings, there is shown a portable rig A of the churn-drill type consisting of a wheeled body portion 1, upon which there is suitably mounted a hoisting mechanism 2 embodying among other features, an adjustable boom 3 and a lifting cable 4, one end of which is connected to a bale or hook 5, and the other end to a winding drum 6, adapted to be operated by a suitable power mechanism (not shown). The intermediate portion of cable 4 is adapted to pass over pulley 7 on the free end of boom 3, guide pulley 8 on the outer end of bracket 9 and pulley 10, journaled in mast 11. The bale or hook 5 of the hoisting mechanism 2 is adapted to engage suspension chain 12, the free ends of which are in engagement with eyelets 13 extending from the upper end of prime mover B. A connection 14 extending between the outer end of bracket 9 and retaining member 16 on boom 3 enables the boom to be secured at any desired angle, as will be understood without further discussion. Drill rig A is also equipped with the requisite piping, control valves, pressure gauges, tanks, etc., necessary to the operation of the hydraulic and pneumatic units, which are mounted on the body portion 1 of the drill rig and operatively associated with the prime mover B and the sample barrel construction G, as will hereinafter appear. With the preceding arrangement, it will be apparent prime mover B suspended from bale 5 of the hoisting mechanism may be raised or lowered with respect to the base ring assembly C, as occasion demands.

*Prime mover.*—For the purpose of driving or pulling the sectional casing used in connection with the instant apparatus, or for driving the sample barrel into or withdrawing it from the soil, this invention makes use of a prime mover B, adapted to be raised and lowered by the hoisting mechanism of the drill rig, as previously described.

Prime mover B which is in the form of a hydraulic jack, comprises hydraulic cylinder 14′, cylinder head 15, and coupling cylinder 17, the head 15 being clamped between flanges 16a and 16b of the hydraulic cylinder 14′ and coupling cylinder 17, as clearly shown in Fig. 4 of the drawings. Mounted within cylinder 14′ for reciprocatory movement is a piston 18 having a piston rod 19 adapted to extend through a suitably pocked opening centrally formed in cylinder head 15, as shown in Fig. 6 of the drawings. The lower end of the piston rod 19 extends into the coupling cylinder 17 of the prime mover and is suitably threaded to engage the coupling member 20. Coupling cylinder 17 is formed with a coupling flange 21, which is radially slotted as at 22 to receive the hinged bolts 23 or 23a to be hereinafter referred to.

The upper dome-shaped end of the hydraulic cylinder 14′ communicates at its central portion with a conduit 25 and the opposite end with the conduit 26, which is connected with conduit 25 through the by-pass 27 and valve 28. With this construction, pressure may be admitted to either face of the piston or it may be by-passed through the valved conduit 27, as will become apparent when the operation of the hydraulic unit has been described. To give access to the coupling element 20 on the lower end of the piston rod and likewise to provide an outlet for the flexible conduits to the sample-taking barrel, coupling cylinder 17 is formed with an opening 29, as clearly shown in Figs. 3 and 4 of the drawings.

*Hydraulic pressure units.*—To impart reciprocatory movement to piston 18 within the hydraulic cylinder 14' of prime mover B, a hydraulic pressure unit E of the type shown in Fig. 4 is resorted to, although it is to be understood other operating means such as steam or air may be employed if desired. Referring to Fig. 4, hydraulic pressure unit E consists of an expansion tank 30, the lower end of which is in communication with the low pressure side of pump 31 through conduit 32. The high pressure side of pump 31 is connected via conduit 34 with port $a$ of the four ports $a$, $b$, $c$ and $d$ formed in the casing of four-way valve 33. The rotor of valve 33 is formed with curved passages $e$ and $f$ which are adapted to interconnect the ports $a$, $b$, $c$ and $d$ in the manner usual to valves of this type.

With the rotor of valve 33 in the position shown in Fig. 4, port $a$ is in communication with terminal nipple 35 through passage $e$, port $c$, conduit 36 and valve 37 for a purpose hereinafter to appear. The intermediate portion of expansion tank 30 communicates with port $d$ in the casing of valve 33 via conduit 38, and port $d$ in turn communicates with port $b$ in the valve casing through the curved passage $f$ in the rotor of the valve. Port $b$ communicates with outlet nipple 39 through conduit 40 and valve 41. Conduits 38 and 34 are interconnected via by-pass conduits 42 and 43 which include the valves 44 and 45 for a purpose hereinafter to appear. To indicate the pressures prevailing in the system conduit 34 includes a suitable pressure indicator 46. The various conduits just referred to and shown diagrammatically in Fig. 4, in actual practice are in the form of pipes rigidly mounted on the drill rig as indicated in Fig. 1 of the drawings, which show some of the valves and the piping. Terminal nipples 35 and 39 are adapted to be connected through flexible tubes 47 and 48 with the inlet nipples 35a and 39a on the free ends of conduits 25 and 26 carried by the prime-mover B. Nipples 35a and 39a communicate with conduits 25 and 26 through valves 49 and 50.

Assuming the hydraulic unit to be connected as shown in Fig. 4 and rotor of valve 33 positioned as indicated, the system filled with a suitable working fluid such as oil and pump 31 in operation it will be apparent, if valves 44, 45, 41, 50 and 28 are closed and valves 37 and 49 opened, pressure will be applied in the upper end of hydraulic cylinder 14' of prime-mover B, to force piston 18 downwardly. On the other hand assuming the rotor of valve 33 to have been rotated so as to interconnect ports $a$ and $b$ through its passage $e$, and further assuming that control valves 37, 49 and 28 are closed and valves 41 and 50 opened, pressure will be applied to the opposite end of hydraulic cylinder 14' to force piston 18 upwardly in the cylinder, as will be understood without further discussion. Either of the by-pass valves 45 or 28 may be used for throttling or idling pump 31 when oil pressure is not required. Pressure relief valve 44 serves to release any excessive pressure which may develop on the discharge side of the pump, as will be understood without further discussion.

*Base ring assembly.*—To mount prime-mover B in operative position the instant invention provides a base ring assembly C which consists of base ring 51, coupling collar 52, casing guide 53 and vaned anchoring rods 54. The base ring 51 embodies a circular base 51a formed peripherally with a ring 52a, radially with slots 53a and centrally with an opening 54a. The slots 53a are defined by the webs 53b which extend upwardly from the base between and interconnecting ring 52a with collar 52, as clearly shown in Figs. 5 and 6 of the drawings. The webs 53b are arranged in pairs and each pair is provided with a seat 56a to receive rocker nuts 51b adapted to be threaded on the upper ends of the anchor rods 54, hereinafter to be referred.

*Base ring extension.*—When occasion requires base ring assembly C is used in connection with base ring extension D consisting of a tubular portion 55 which is externally threaded adjacent its opposite ends to engage the internally threaded coupling collars 56 and 57 respectively. Collar 56 is radially notched as at 58 and equipped with hinge bolts 23 adapted to be swung upwardly and into the notches 58, as shown in Figs. 3 and 5 of the drawings. Lower coupling ring 57 is likewise radially notched as at 60 to receive the bolts 23a which are hinged to collar 52 of base ring assembly C, as shown in Figs. 5 and 6 of the drawings. This extension D permits the use of casing and driving stem sections in lengths equal to twice the length of the effective stroke of the piston in prime-mover B. To place the base ring assembly C in position to receive prime-mover B, a hole of sufficient depth to accommodate guide casing 53 is bored in the ground into which casing guide 53 is lowered until base ring 51 attached to the upper end of the casing, comes to rest upon the ground. As the base ring 51 attains its seat on the ground the upper ends of anchoring rods 54 which have been previously screwed into the ground at the proper angle are directed through the slots 53a between webs 53b. Rocker nuts 51b are then placed upon the threaded ends of rods 54 and tightened until the base ring 51 has been drawn firmly onto the ground. This construction affords an anchorage which will readily resist the vertical and horizontal displacement forces to which the assembly is subjected when prime-mover B is in operation, as will be readily understood without further description.

When base ring 51 has been positioned as stated, the flange 57 of extension D is placed upon collar 52, whereupon bolts 23a are swung upwardly into the registering notches in the two coupling collars and the nuts on the end of the bolts are tightened until extension D has been rigidly coupled to collar 52 of the base ring assembly. The base ring assembly C and extension D are now in readiness to receive the prime mover B. In the event extension D is not required, coupling flange 22 of coupling cylinder 17 is brought into engagement with collar 52 and the prime mover B and base ring assembly bolted together as in the case of extension D, just described. Before attaching prime mover B to coupling collar 56 of extension D, two lengths of suitably united casing sections will be in position for the casing installation which will hereinafter be described.

*Sectional casing assembly.*—The base ring assembly C and extension D having been set up as previously stated, at the site selected for sample taking, the next operation resides in sinking the sectional casing F until its lower end reaches the level at which the sample is to be obtained. To effect this installation a length 63 of sectional casing F is provided at its lower end with a shoe 63a and at its opposite end with an internally threaded ring 64. When thus equipped section 63 is lowered through the casing guide of the base ring assembly C until its lower end comes to rest in the plane of the lower end of casing guide 53; in other words at the bottom of the hole bored to receive the casing guide. When in this position the upper end of casing 63 will be disposed within collar 52 of base ring assembly C.

With the casing section 63 positioned in this manner prime mover B is connected through the flange of its coupling cylinder 17 to coupling collar 52 of assembly C so that the driving head 67 (previously connected with coupling member 20 on the lower end of piston rod 19) engages ring 64 in the upper end of casing 63. Power is now applied to the upper face of piston 18 to drive the latter downwardly to the limit of its stroke which forces casing 63 into the ground and into the position which it occupies in Fig. 6 of the drawings. When the casing 63 has reached this position power is applied to the opposite face of piston 18 for the purpose of returning the piston to its original position, thus withdrawing the driving head from casing guide 53, as will be understood without further discussion.

Prime mover B is now disconnected from collar 52 of assembly C and elevated by the hoisting mechanism sufficiently to permit extension D to be coupled to the assembly C. Extension D is now placed in position and its coupling collar 57 bolted to the coupling collar 52 of assembly C by the hinge bolts 23a, as hereinabove described. A length of casing is lowered through extension D and screwed into the ring 64 on the upper end of section 63, thus placing the ring 66 in the position shown in Fig. 6, with the driving head 67 engaging the edge of the ring in position for the next driving stroke of the piston.

Prime mover B having been lowered so as to place the flange of its coupling cylinder 16 in engagement with collar 56 of extension D, the bolts 23 are properly positioned their nuts tightened and the prime mover B thus rigidly and securely bolted to extension D, as shown in Fig. 6 of the drawings. Power is now applied to the upper surface of piston 18 to drive casing section 63 further into the ground. When the piston has reached the limit of its down stroke, section 65 of casing F will be in the position now occupied by section 63 in Fig. 6. This procedure is repeated until the lower end of section 63 reaches the level at which a sample is to be taken. The casing F is removed from the ground section-by-section in the manner of its insertion and for this purpose a pulling head 68, shown in Fig. 11 of the drawings, is substituted for the driving head 67, shown in Fig. 6, as will be understood without further discussion.

*Sample barrel construction.*—With the sectional casing F in place, the instant apparatus is in condition to receive the sample barrel G and its associated parts, comprising sectional driving stem 69, coupling assembly 71, by which the driving stem is connected to the sample barrel G, flexible tubes 72 and 73 and the pneumatic unit H.

Sample barrel G consists of an upper cylindrical section 70a and a lower similarly shaped section 70b which is internally threaded adjacent its upper end to engage the externally threaded lower end of section 70a as at 74. The lower end of barrel section 70b is internally threaded as at 75 to receive the externally threaded portion 76 of the shoe 77. Shoe 77 is provided intermediate its ends with a circumscribing slot 78 which forms a seat for the sample cutting wire loop hereinafter to be referred to. The upper section 70a of the sample barrel is formed with an internally threaded neck portion 79 which is closed at its lower end by a horizontally disposed partition 80 having a valve opening 81 formed with a valve seat for the valve 82. The stem of valve 82 extends through the guide frame 83 depending from the under surface of partition 80, as shown in Fig. 7 of the drawings. A loading spring 84 normally retains the valve 82 in its seat for a purpose hereinafter to appear.

A cam shaft 85 extends across the neck portion 79 and is journaled immediately above valve 82. Shaft 85 is provided with a cam 86 adapted, when the shaft is rotated, to engage and hold valve 82 on its seat. Shaft 85 is equipped with an operating handle 87 and a spring 88 which normally maintains the cam in an inoperative position, as shown in Fig. 7 of the drawings. Adjacent neck portion 79 the sample taking barrel G is formed with bosses 89a and 89b (Fig. 9), which are internally bored as at 90a and 90b. The upper ends of the bosses are internally threaded to receive the lower ends of flexible tubes 72 and 73 connected with the pneumatic unit H, as shown in Fig. 4 of the drawings. Bore 90a communicates at its lower end with air passage 91 which extends down the side of the sample barrel G and opens into the slot 78 in shoe 77 via the inclined passage 92. On the opposite side of the sample barrel G there is located a wire passage 93, the lower end of which communicates as at 94 with the slot 78 in shoe 77. The upper end of passage 93 opens to the exterior of the barrel through outlet 94, as shown in Fig. 7 of the drawings. The lower end of the bore 90b in boss 89b communicates with an opening 95 in the upper end of barrel section 70a, as shown in Fig. 7 of the drawings. Positioned in the circular slot 78 of shoe 77 is a loop 96 formed on the end of wire 97 which is adapted to extend upwardly through the wire passage 93 and through opening 94 to the surface of the ground for a purpose to hereinafter appear.

The coupling assembly 71, by which the lower end of driving stem section 69 is connected to the reduced portion 79 of the sample barrel, comprises a nipple 98 which is externally threaded at its lower end for engagement with the internal threads of reduced portion 79. The upper end of nipple 98 is threaded into the coupling ring 100 and into approximately meeting relation with the lower externally threaded end of driving stem section 69. Between the meeting ends of driving stem section 69 and nipple 98 is arranged a horizontally disposed partition 101 having therein an opening 102 formed with a seat for the ball valve 103, as clearly shown in Fig. 7 of the drawings. The hollow sectional driving stem 69 is formed adjacent its lower end with an outlet 78 for the passage of air released when ball valve 103 has been unseated. The upper end of the sectional valve stem 69 is threaded for engagement with either the coupling element of another section or with coupling member 20 connected to the lower end of piston rod 19 of prime mover B, as shown in Fig. 5 of the drawings. To provide guiding means for driving stem 69 during its reciprocatory movement within the sectional casing F, said stem is provided with a series of suitably spaced radially extending fins 104, as shown in Fig. 5 of the drawings. In the drawings but one section of the sectional driving stem 69 has been shown, but it is to be understood that in practice, the apparatus will utilize as many sections as the depth of the sample-taking level may require.

To form the sample in a removable metallic casing the lower section 70b of the barrel is provided with a thin metal liner 105, the upper and lower edges of which abut the lower edge of section 70a and the upper edge of the threaded portion of shoe 77 respectively, as shown in Fig. 7 of the drawings. After the sample has been taken this liner is adapted to be removed from the section 70b of the barrel, capped at its opposite ends, sealed and sent to the soil laboratory.

*Pneumatic unit associated with sample barrel.*—As previously stated, the free ends of the flexible tubes 72 and 73 are connected to the pneumatic unit H, which like the hydraulic unit E is suitably mounted upon the drill rig A, as indicated in Fig. 1 of the drawings. Pneumatic unit H consists of air pressure tank 106 and vacuum tank 107. The upper end of pressure tank 106 is connected through conduit 108 and control valve 110 to terminal nipple 109, which in turn engages the free end of flexible tube 72. The opposite end of tank 106 is connected to the high pressure side of air compressor 111 through conduit 112 and check valve 113.

The low pressure side of compressor 111 connects with vacuum tank 107 through conduits 114 and 115 and the vacuum check valve 116, as shown in Fig. 4 of the drawings. In this manner air compressor 111 serves the double purpose of compressing air in pressure tank 106 and creating a vacuum in tank 107, as will be understood without further discussion. The conduit 112 connecting tank 106 with compressor 111 includes an automatic pressure relief valve 116a and a manually operated pressure control valve 117 for the purpose of reducing the pressure in the system automatically or manually. Likewise the conduit 114 includes automatic vacuum relief valve 118 and manually operated vacuum relief valve 119 for vacuum controlling purposes.

The top of vacuum tank 107 is connected via conduit 123 with opening *a* of the three openings *a*, *b* and *c* in the casing of three-way valve 121. Opening *b* is connected via conduit 123a with terminal nipple 120 through control valve 122 and the remaining opening *c* to branch conduit 108a extending from conduit 108. The rotor of three-way valve 121 is formed with a passage *d* which is bisected by the passage *e* to permit either air pressure or vacuum to be connected with terminal nipple 120 and the flexible tube 73 in engagement therewith. Conduits 108 and 123 include pressure and vacuum indicating gauges 124 and 125 respectively, as shown in Fig. 4 of the drawings.

Although the various connections mentioned in the preceding descriptive matter have been referred to as conduits, it is to be understood in actual practice they are in the form of pipes rigidly mounted on the drill rig as indicated in Fig. 1 of the drawings.

Occasionally in the operation of taking a sample as the sample barrel is driven into the ground it encounters a rock, too large to enter the barrel. In this event the sample barrel is withdrawn from the casing and the shoe 77 removed and replaced with the bullet-nosed shoe 130, as shown in Fig. 10 of the drawings. The barrel is then returned to the casing and as the bullet-nosed shoe is driven into the ground, the shoe by virtue of its shape will force the rock to one side.

*Operation.*—The structural features of this invention having been defined, its operation will be seen to be as follows:

Assuming that assembly C has been anchored at the site selected for sample taking and the prime mover B suspended above the assembly C by the hoisting mechanism on the drill rig, as shown in Fig. 1, the requisite operating pressure and vacuum prevailing in the hydraulic and pneumatic units respectively and that the subterranean level at which the sample is to be taken requires several sections of casing F, then to procure an undisturbed soil sample with the instant invention, the leading section 63 of casing F is lowered into the casing guide 53 of assembly C, until its lower end comes to rest at the bottom of the hole previously bored to receive the casing guide.

Prime mover B equipped with a suitable driving head 67 is lowered by the hoisting mechanism into engagement with and coupled to the ground anchored assembly C which positions driving head 67 in engagement with the collar or union 64 on the upper end of the leading section 63, as shown in Fig. 6 of the drawings. After the four-way valve 33 of the hydraulic unit E has been suitably adjusted, control valves 37 and 49 are opened sufficiently to apply pressure to the upper surface of piston 18 in the prime mover and as its piston 18 moves downwardly, the shoe 63a on leading section of casing F will be driven into the soil to the limit of the piston stroke. When piston 18 has the end of its travel the four-way valve 33 is suitably adjusted and control valves 41 and 50 opened to apply retractive pressure to the under surface of piston 18 so as to effect its return to its initial position, whereupon prime mover B and assembly C are uncoupled and the prime mover hoisted to the position shown in Fig. 1 of the drawings.

Base ring extension D is now coupled to assembly C and another section of casing F lowered through extension D into casing guide 53 and screwed into the collar or union 64 on the upper end of the leading section. Prime mover B is then lowered by the hoisting mechanism into engagement with and coupled to the coupling flange of extension D, as shown in Fig. 2 of the drawings. Four-way valve 33 of the hydraulic unit D is suitably adjusted and control valves 37 and 49 opened sufficiently to apply pressure to the upper surface of piston 18 to drive the leading section deeper into the soil. This procedure is repeated until the lower end of the leading section of casing F attains the level at which the sample is to be taken. To withdraw the sections of casing F for core removal and other purposes, driving head 67 is removed and replaced with a pulling head 68 which is adapted to be threaded into the collar 66 on the upper end of the section, as shown in Fig. 11 of the drawings.

After casing F has been driven to the required depth, prime mover B is uncoupled and the apparatus is ready for the sample taking operation and for this purpose sample taking barrel G, equipped with a metallic liner 105 and arranged as shown in Fig. 7, is attached to the lower end of a section of the hollow sectional driving stem 69 and lowered through casing F until its shoe 77 comes to rest at the lower end of the casing whereupon the free end of driving stem 69 is connected to the free end of the piston rod 19 and prime mover B is then lowered into engagement with and coupled to a coupling flange of extension D, as shown in Fig. 2 of the drawings.

To exclude water or other contaminating fluid, which may be standing in the casing, from the sample barrel, three-way valve 121 of pneumatic unit H is suitably adjusted and control valve 110 opened slightly before the sample barrel is lowered into the casing, so as to connect pressure tank 106 with the interior of the sample barrel G through opening 95 therein and flexible conduit 72, and establish a flow of air through the barrel which will prevent the rise of water therein as said barrel descends the casing.

With the piston of prime mover B at the top of its stroke and the sample barrel B in position to be driven into the soil, four-way valve 33 of the hydraulic unit D is adjusted and control valves 37 and 49 opened to apply pressure to the upper surface of piston 18. As the piston is moved downwardly by virtue of this pressure, the sample barrel will be driven into the soil to the limit of the piston stroke at a uniform and constant pressure thus forming the sample without shock or jar which would tend to disturb its geological characteristics. As the sample barrel is driven into the soil, displaced air will increase the pressure within the barrel sufficiently to lift valve 82 from its seat against the action of loading spring 84 and permit the air to pass from the barrel into nipple 98. After entering nipple 98, the air, displacing ball valve 103, will flow into the lower end of the driving stem and escape through opening 78 therein, as shown in Fig. 7 of the drawings.

The sample barrel G having been forced into the soil to the limit of the downward stroke of the piston, three-way valve 121 of the pneumatic unit H is adjusted and valve 122 opened to connect vacuum tank 107 with opening 95 in section 70a of valve G through tube 73, thus creating a vacuum in the upper portion of the barrel above the sample for the purpose of securely retaining the latter against displacement as the barrel is brought to the surface. Wire 97 threaded through passage 93 is now pulled to draw the loop 96 through the sample and sever it from the mother soil. Three-way valve 122 and control valve 110 of the pneumatic unit H are next adjusted to connect the pressure tank 106 with bore 95a through tube 72. The air passing down conduit 92 in the side of barrel G emerges from the lower end of said barrel through the passage 92, as shown in Fig. 7 of the drawings, and produces a flow of air from the lower end of the barrel, which will prevent contamination of the sample during the withdrawal of the barrel from the casing, as will be understood without further discussion.

Four-way valve 33 of the hydraulic unit D having been properly adjusted and control valves 41 and 50 opened, pressure will be applied to the under surface of piston 18 to withdraw the barrel with its sample from the soil. Prime mover B and assembly C are then uncoupled, driving stem 69 and piston rod 19 disconnected and the barrel drawn to the surface for removal of its sample. To remove the sample the vacuum is destroyed, shoe 77 removed and liner 105 with its sample taken from the barrel. The liner is capped at its opposite ends and then sealed for transmission to the soil laboratory.

With some types of samples, expansion of the liner against the inner surface of the barrel G renders removal of the liner difficult. In this event cam 86 is brought into engagement with valve 82 to hold the latter on its seat and sufficient air pressure is applied to the sample to effect its ejection from the barrel.

*Conclusion.*—In conclusion it will be apparent this invention provides a method and apparatus for obtaining soil samples by means of which factors tending to disturb its geological and chemical characteristics are reduced to a minimum and which could be applied to the standard rotary core drill rig with relatively few alterations of the rig, thus enabling the latter to serve the dual purpose of drilling and sample taking.

Having described our invention, what we claim as new and wish to secure by Letters Patent is:

1. In a power operated drilling machine, the combination with a prime mover including a pressure cylinder, a reciprocatory piston within the cylinder, means for supplying pressure to the upper and lower faces of the piston through the opposite ends of the cylinder, means for connecting the piston with an interchangeable drilling implement and coupling means carried by the prime mover; of a ground anchored assembly including a base, a coupling collar on the base, interacting means between the coupling collar and coupling means carried by the prime mover for effecting a rigid but quick detachable engagement between the prime mover and ground anchored assembly, and means for clamping the base on and firmly securing it to the ground, said means including a plurality of anchoring rods and coacting means on the upper ends of the rods and said base.

2. In a power operated drilling machine, the combination with a prime mover including a pressure cylinder, a reciprocatory piston, a piston rod within the cylinder, means for supplying pressure to the upper and lower faces of the piston through opposite ends of the cylinder, means for connecting the free end of the piston with an interchangeable drilling implement and a coupling means carried by the prime mover; of a ground anchored assembly including a base having therein a central opening, a coupling collar on the base concentric with its opening, interacting means between the coupling collar and coupling means carried by the prime mover for effecting a rigid but quick detachable engagement between the prime mover and ground anchored assembly, and means for clamping the ground anchored assembly on and securing it firmly to the ground, said means including a plurality of vaned anchoring rods and coacting means on the upper ends of the rods and on said base.

3. In a power operated drilling machine, the combination with a prime mover including a hydraulic cylinder, a piston and piston rod fitting within the cylinder, means for introducing and withdrawing operating fluid from the ends of the cylinder for supplying pressure to the opposite faces of the piston, means for connecting the free end of the piston rod to a detachable drilling implement, and a radially notched coupling collar attached to and offset from the lower end of said prime mover; of a base ring assembly including a base having therein a central opening, and a plurality of slots radiating from the opening, a radially notched coupling collar mounted on the base concentric with said opening, the notches on the last mentioned coupling collar being adapted to register with the notches in the coupling collar of the prime mover when the respective coupling collars have been brought into abutting relation, fastening elements hinged to the coupling collar on said base and movable into the registering notches of the abutting collar for effecting a rigid but quick detachable connection between the prime mover and base ring assembly, and means for clamping the base ring assembly to and firmly securing it on a supporting bed, said means embodying a plurality of vaned anchoring rods having their upper ends passing through the radially extending slots in the base, and interacting means on the free ends of the rods and on said base.

4. In a power operated drilling machine, the combination with a prime mover including a hydraulic cylinder, a piston rod fitted within the cylinder, means for introducing and withdrawing operating fluid from the extremities of the cylinder for supplying operating pressure to the opposite faces of the piston, means for connecting the free end of the piston with an interchangeable drilling implement, and a radially notched coupling collar attached to the lower end of the hydraulic cylinder and in vertically offset relation with respect thereto; of a base ring assembly including a base having therein a central opening, a radially notched coupling collar concentric with the opening and disposed at the inner ends of a series of radially extending slots formed in said base, a plurality of fastening elements hinged to the coupling collar of the base, and movable into the notches of the coupling collar on the base and that of the prime mover, when said collars have been brought into abutting relation, said fastening elements effecting a rigidly but quick detachable connection between the prime mover and base ring assembly, a casing guide depending from the base and having its upper end extending through the opening therein and threaded into said collar, and means for clamping the base ring assembly on and firmly securing it to a supporting bed, said means embodying means to receive the casing guide, a series of vaned anchoring rods, the lower ends of said rods passing through the radially extending slots in the base, and fastening means on the free ends of the rods fitting into seats formed in the base.

5. In a power operated drilling machine, the combination with a prime mover including a hydraulic cylinder, a piston and a piston rod fitted within the cylinder for reciprocatory movement, means for introducing and withdrawing fluid from the extremities of the cylinder for supplying and withdrawing operating pressure to and from the opposite faces of the piston, means for connecting the free end of the piston rod with an interchangeable drilling implement, and a coupling collar secured to the lower end of the prime mover; of a base ring assembly including a base having therein a central opening, a coupling collar on the base and concentric with the opening, a casing guide depending from the base, said guide passing through the opening in the base and being threaded into the collar, means for clamping the base ring assembly on and firmly securing it to a supporting bed, said means including means for receiving the casing guide, a plurality of vaned anchoring rods, the upper ends of the rods passing through a series of slots formed in the base and coacting means on the free ends of the rods and on said base, and means for rigidly interconnecting the prime mover and the base ring assembly in vertically offset relation, said means comprising a base extension and means at the opposite ends of the extension for effecting a quick detachable connection between the coupling collar of the prime mover and that of the base ring assembly.

6. In combination a wheeled vehicle, a derrick structure thereon, a tackle for the derrick, a prime mover suspended for raising and lowering by the tackle, said prime mover including a hydraulic cylinder, a piston and piston rod mounted within the cylinder for reciprocatory movement, a drilling implement detachably connected with the free end of the piston rod, a hydraulic unit on said vehicle, said unit including a source of compressed motor fluid, pipe connections on both ends of the cylinders and a distributing valve means controlling the motor fluid to the cylinder for effecting reciprocation of its piston, a ground anchored assembly including a base formed with a central opening and adapted to rest upon the ground, a hollow casing guide depending from the base and having its upper end projecting into the opening in said base, means for clamping the ground anchored assembly on and securing it to the ground, and means for effecting a quick detachable connection between the prime mover and the ground anchored assembly.

7. In combination a wheeled vehicle, a derrick structure thereon, a tackle for the derrick, a prime mover suspended for raising and lowering by the tackle, said prime mover including a hydraulic cylinder, a piston and piston rod mounted for reciprocatory movement within the cylinder, a detachable drilling implement affixed to the free end of the piston rod, a coupling collar carried by the lower end of said prime mover, a hydraulic unit mounted upon the wheeled vehicle, said unit including a source of compressed fluid, flexible pipe connections to both ends of the hydraulic cylinder and a distributing valve means controlling the flow of the fluid to and from the opposite ends of the cylinder, a ground anchored assembly including a base formed with a central opening and adapted to rest upon the ground, a collar mounted upon the base and concentric with its opening, a hollow casing guide depending from the base and projecting into the ground, the upper end of the guide passing through the opening in the base and being attached to said collar, means for clamping the ground anchored assembly on and securing it to the ground, said means including a plurality of anchoring rods and interacting means between the free ends of the rods and said base to draw the latter firmly upon the ground, and means for effecting a quick detachable engagement between the coupling collar of the prime mover and that of the base when said collars have been brought into abutting relation.

8. In combination a wheeled vehicle, a derrick structure thereon, a tackle for the derrick, a prime mover suspended for raising and lowering by the tackle, said prime mover including a hydraulic cylinder, a piston and piston rod mounted for reciprocatory movement in the cylinder, a detachable drilling implement affixed to the free end of the piston rod and a coupling collar carried by the lower end of said prime mover, a hydraulic unit mounted upon the wheeled vehicle, said unit including a source of compressed fluid, flexible pipe connections to both ends of the hydraulic cylinder and a distributing valve means controlling the flow of the fluid to and from the opposite ends of the cylinder, a ground anchored assembly including a base formed with a central opening and adapted to rest upon the ground, a collar mounted upon the base and concentric with its opening, a hollow casing guide depending from the base and projecting into the ground, the upper end of the collar passing through the opening in the base and being affixed to said collar, means for clamping the ground anchored assembly on and securing it to the ground, said means including a plurality of vaned anchoring rods and interacting means between the base and the upper ends of said rods, a base extension rigidly connected to the collar of said base, and means in connection with the free extremity of said base extension for effecting a quick detachable connection between said free extremity and the coupling collar of the prime mover.

9. In a sample taking apparatus the combination with a prime mover including a reciprocatory piston and means for imparting pressure to and withdrawing it from the opposite surfaces of the piston; of a ground anchored base having therein a central opening, means for detachably connecting the prime mover to the base, a casing projecting from the base into the ground and having its upper end extending through the opening in the base, a sample taking barrel operable within the casing, said barrel including a cylindrical member open at its lower end and having its upper end closed, means for attaching the upper end of said member to the piston of said prime mover, the attachment being such that a single downward stroke of the piston will drive the sample taking device into the ground sufficiently to form the required sample therein, a shoe affixed to the open end of the sample taking barrel and a remote controlled means in connection with the shoe for severing the sample from the soil.

10. In a sample taking apparatus the combination with a prime mover including a piston, and means for applying operating pressure to and withdrawing it from the opposite surfaces of the piston; of a ground anchored base having therein a central opening, a collar mounted on the base concentric with the opening, and a casing extending into the ground and connected at its upper end to said collar, a sample taking barrel operable within the casing and including a cylindrical member having its upper end closed and its lower end open, means for connecting the upper end of the sample taking device with the piston of the prime mover, a valve control means in the upper end of the sample taking barrel for permitting escape of the air displaced by the sample, and vacuum creating means in controlled communication with the interior of the sample barrel above the sample for retaining the latter in position during withdrawal of the barrel.

11. In a sample taking apparatus the combination with a prime mover including a cylinder, a piston and piston rod fitted within the cylinder, a source of fluid pressure in connection with the opposite ends of the cylinder and valve distributing means for controlling the flow of fluid to and from the opposite ends of said cylinder; of a ground anchored base having therein a central opening, a collar mounted on the base and concentric with the opening, a casing depending from said opening and connected at its upper end to said collar, means for effecting a quick detachable connection between the collar and said prime mover, a sample taking device operable within the casing and including a cylindrical member normally closed at its upper end and having its lower end open, a shoe affixed to the open end of said member, means connecting the upper end of said member with said piston rod, the connection being such as to enable a single downward stroke of the piston to drive the sample taking device into the soil sufficiently to form the required sample therein, valve means in the upper end of the sample taking barrel, said valve means being normally closed but operable to permit escape of the air displaced by the sample, and a remote controlled snare seated in the lower end of the sample taking barrel and operable to sever the sample from the soil.

12. In a sample taking apparatus the combination with a prime mover including a cylinder, a piston and piston rod fitted within the cylinder, a source of fluid under pressure and in communication with the opposite ends of the cylinder, valve distributing means for controlling the flow of said fluid to and from the opposite ends of said cylinder, and a coupling means attached to the lower end of the prime mover; of a base having therein a sample opening, a coupling collar mounted on the base and concentric with the opening, a casing depending from said base and having its upper end extending through the opening therein and attached to said collar, means for detachably connecting the coupling means of the prime mover with the collar of said base, a sample taking barrel operable within the casing, the lower end of the barrel being open, the upper end normally closed, a liner within said barrel, a shoe affixed to the lower end of the barrel immediately below the liner, a connection between the upper end of said barrel and the free end of the piston rod, the connection being such that a single downward stroke of the piston will drive the barrel into the soil sufficiently to fill the liner with a sample, means in connection with the upper end of the barrel for creating a vacuum therein to retain the sample within the barrel, a source of compressed air associated with the upper end of the sample taking barrel, valve controlled means for permitting a stream of air from the source of compressed air to be directed from the lower end of the barrel beneath the sample therein, and a remote controlled means associated with the shoe for severing the sample from the parent soil.

13. A sample taking barrel adapted to reciprocate within a casing and comprising a cylindrical member open at its lower end and normally closed at its upper end, a pneumatic unit including a vacuum creating means and a source of compressed air, a metallic liner within said barrel adapted to receive a soil sample, valve controlled means in connection with said vacuum creating means and said cylindrical member for creating a vacuum within the sample taking barrel above the sample therein, valve control means in connection with the source of compressed air and said cylindrical member for directing a stream of air through the barrel, means in the upper end of the barrel and operable to permit escape of the air displaced by the sample as the latter is formed in the liner.

14. A sample taking barrel adapted to operate in a well casing and comprising a cylindrical member normally closed at its upper end and open at its lower end, a shoe affixed to the lower end of said member, an opening formed in the upper end of said member, a valve normally closing said opening but operable by displaced air to permit escape of the latter, a pneumatic pressure unit including a vacuum creating means, and a source of compressed air, a metallic liner within said barrel adapted to be filled by a soil sample, valve controlled connections between the vacuum creating means and the upper end of said barrel for creating a vacuum therein to retain said sample within the barrel, valve control means between the source of compressed air and said barrel for directing a stream of air from the lower end of said barrel beneath the sample, and a manually operated cam coacting with the valve in the upper end of the barrel for retaining the latter on its seat whereby to develop a sample ejecting pressure within the barrel, and means in connection with the said shoe for severing the sample from the soil.

15. In a power operated drilling machine the combination with a prime-mover including a pressure cylinder, a reciprocatory piston within the cylinder, means for supplying pressure to the upper and lower faces of the piston through opposite ends of the cylinder, means for connecting the piston with an interchangeable drilling implement, and coupling means carried by the prime-mover; of a ground anchored assembly including a base, a coupling collar on the base, interacting means between the coupling collar and coupling means carried by the prime-mover for effecting a rigid but quick detachable engagement between the prime-mover and ground anchored assembly, and means for clamping the ground anchored assembly on and firmly securing it to the ground.

16. In a sample taking apparatus the combination with a prime-mover including a piston and means for applying power operating pressure to and withdrawing it from the opposite surfaces of the piston; of a ground anchored assembly, including a base, a casing depending from the base and extending into the ground, means in connection with the ground anchored assembly and the prime-mover for effecting a quick detachable engagement therebetween, a sample taking barrel operable within the casing and including a cylindrical member having its upper end normally closed and its lower end open, means for connecting the upper end of the sample taking barrel with the piston of the prime-mover, compressed air means in connection with the sample taking barrel for producing a flow of air from the barrel beneath the sample therein, a valve controlled means in the upper end of the sample taking barrel for permitting escape of the air displaced by the sample, and a vacuum creating means in controlled communication with the upper portion of the sample taking barrel for creating a vacuum interior of the barrel above the sample to retain the latter in position during the withdrawal of said barrel.

RALPH N. PLATTS.
FRANCIS B. SLICHTER.
ERNEST L. O'DONNELL.
PRESTON T. BENNETT.